(12) United States Patent
Vasconcelos et al.

(10) Patent No.: US 10,184,825 B2
(45) Date of Patent: Jan. 22, 2019

(54) DUST PROTECTOR FOR A WEIGHING BAR ASSEMBLY

(71) Applicant: Robert Bosch Limitada, Campinas—SP (BR)

(72) Inventors: Alvaro Augusto Vasconcelos, Campinas (BR); Luis Fernando L. Ribeiro, Jr., Campinas (BR)

(73) Assignee: Robert Bosch Limitada, Campinas (BR)

( * ) Notice: Subject to any disclaimer, the term of this patent is extended or adjusted under 35 U.S.C. 154(b) by 0 days.

(21) Appl. No.: 15/824,300

(22) Filed: Nov. 28, 2017

(65) Prior Publication Data

US 2018/0149514 A1    May 31, 2018

(30) Foreign Application Priority Data

Nov. 29, 2016 (BR) .............................. 202016028029

(51) Int. Cl.
*G01G 21/30* (2006.01)
(52) U.S. Cl.
CPC .................... *G01G 21/30* (2013.01)
(58) Field of Classification Search
USPC ........................................................ 177/238
See application file for complete search history.

(56) References Cited

U.S. PATENT DOCUMENTS

| 2003/0234122 A1* | 12/2003 | Kroll | B66F 17/003 |
| | | | 177/146 |
| 2008/0314650 A1* | 12/2008 | Duppre | G01G 21/22 |
| | | | 177/145 |
| 2014/0083780 A1* | 3/2014 | Tsutaya | G01G 3/00 |
| | | | 177/211 |
| 2018/0164147 A1* | 6/2018 | Liebsch | B01L 1/04 |

FOREIGN PATENT DOCUMENTS

| BR | 20151031525 A2 | 6/2017 |
| JP | 11142228 A * | 5/1999 |
| WO | 2017100890 A1 | 6/2017 |

OTHER PUBLICATIONS

Translation Description JPH11142228 published May 28, 1999.*

* cited by examiner

*Primary Examiner* — Natalie Huls
*Assistant Examiner* — Monica S Young
(74) *Attorney, Agent, or Firm* — Michael Best & Friedrich LLP

(57) ABSTRACT

A dust protector for a weighing bar assembly (10), particularly usable under weighing platforms that comprises a structural body (1) defining two longitudinal ends, which comprise the dust protector (20), which, when projected in a top view, defines a C-shaped profile, comprising three plane rectangular plates (22, 23, 24) and three outer flaps (25, 26, 27), each of the flaps (25, 26, 27) extending perpendicularly from each of the plates (22, 23, 24), respectively, the flaps (25, 26, 27) being supported on the same (Continued)

support plane of the profile (21), enabling reduction in the accumulation of residues/debris on support portions of the weighing bar assembly (10), being easy to manufacture, mount and maintain, facilitating the cleaning of the assembly (10).

1 Claim, 3 Drawing Sheets

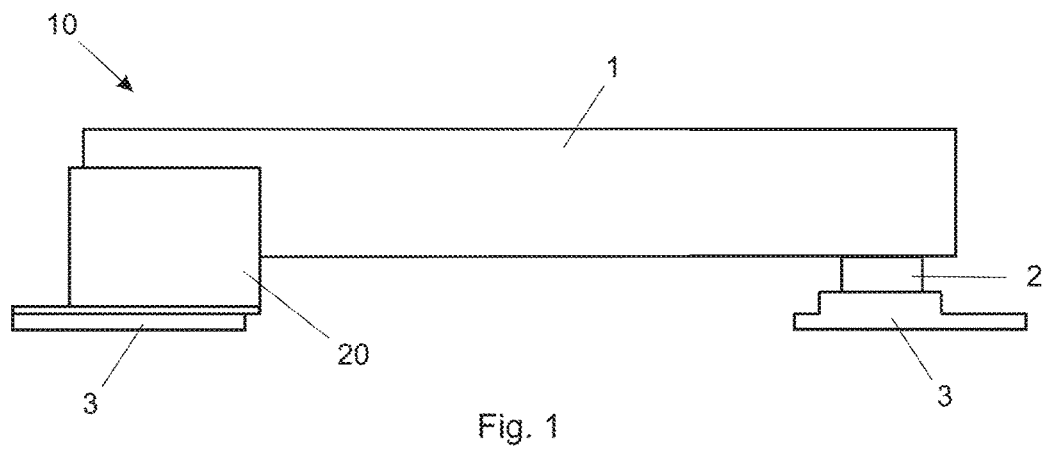
Fig. 1
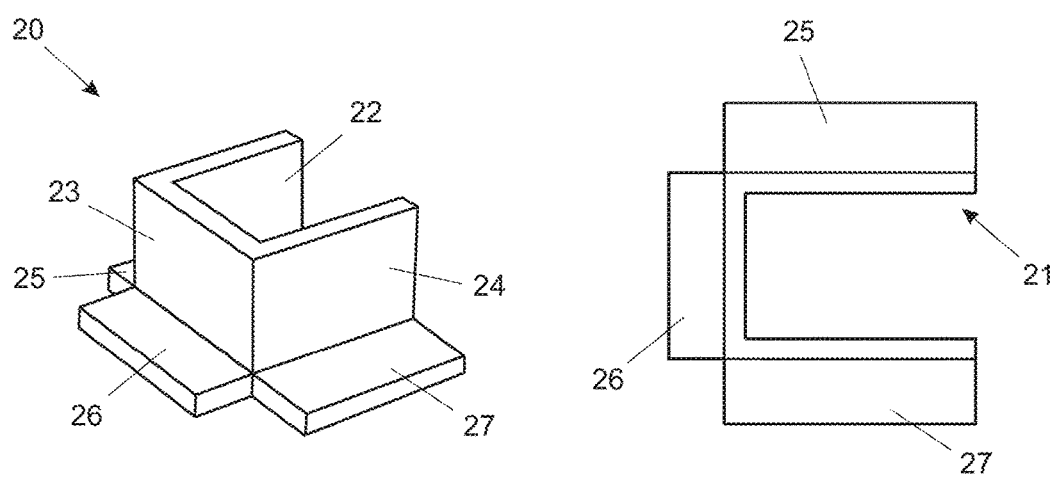
Fig. 2
Fig. 3
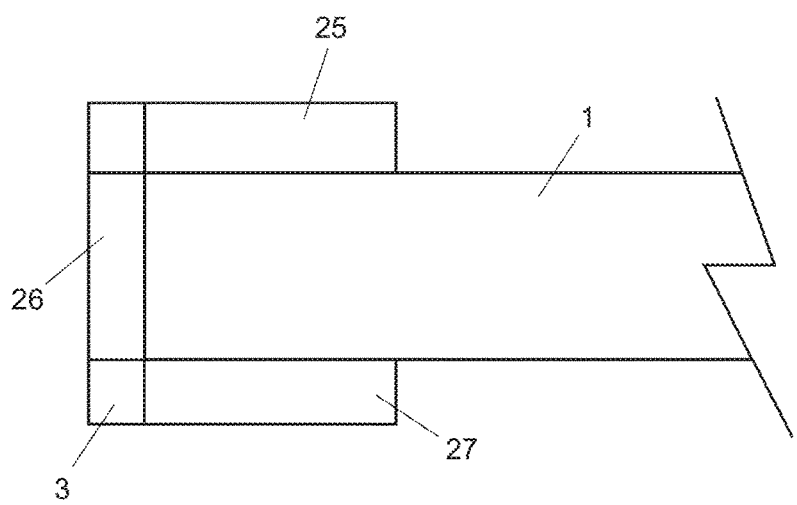
Fig. 4

DUST PROTECTOR FOR A WEIGHING BAR ASSEMBLY

BACKGROUND OF THE INVENTION

The present invention relates to a dust protector for a weighing bar assembly disclosed in the patent application BR 10 2015 031525-2.

Weighing bars are employed to accommodate load cells and are usually positioned under weighing platforms. Therefore, weighing bars must be robust in order to support the whole weight of the load to be weighed, in addition to the weight of the weighing platform, without any structural alteration. They further should house the load cells in safety, enabling their free displacement, in order to make weight assessment feasible.

According to the different places where weighing bars can be applied, for example, in open field, exposed to bad weather conditions such as rainwater and muds, there is a need to have an easy-to-maintain-and-clean assembly.

One cannot observe, in the prior art, any weighing bar assembly comprising at least one dust protector at each of its longitudinal ends, capable of reducing significantly the accumulation of residues/debris on support portions of the assembly.

SUMMARY OF THE INVENTION

Thus, the objective of the invention is to provide a dust protector for a weighing bar assembly that is arranged at the longitudinal ends of the assembly and enable reduction of the accumulation of residues/debris on support portions of the weighing bar assembly, which is easy to manufacture, mount and maintain, facilitating the cleaning of the assembly.

The objectives of the present invention are achieved by means of a dust protector for a weighing bar assembly, which comprises a structural body defining two longitudinal ends, each of the body ends comprising the dust protector, which, when projected in a top view, defines a C-shaped profile, the profile including three plane rectangular plates and three outer flaps, each of the flaps extending perpendicularly from each of the respective plates, the flaps being on the same support plane of the profile.

BRIEF DESCRIPTION OF THE DRAWINGS

The invention will now be described in greater detail with reference to the drawings. The figures show:

FIG. 1—a side view of the weighing bar assembly comprising the dust protector of the invention arranged at one of its longitudinal ends;

FIG. 2—a perspective view of the dust protector of the invention;

FIG. 3—a top view of the dust protector of the invention;

FIG. 4—a top view of the weighing bar assembly comprising the dust protector of the invention;

DETAILED DESCRIPTION

Figure 1A:
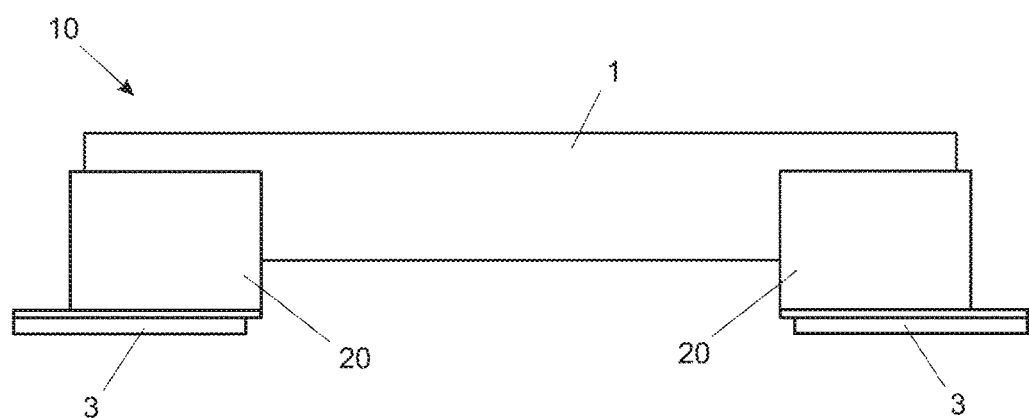
FIG. 1A—a side view of the weighing bar assembly comprising a dust protector of the invention arranged at both of its longitudinal ends.

With reference to the drawings, one observes in FIG. 1 a side view of a weighing bar assembly 10 comprising a structural body 1 that defines two longitudinal ends, each of the ends resting on an elastomeric cushion 2 supported by a support shoe 3 and at least one dust protector 20.

Each of the longitudinal ends of the body 1 of the weighing bar assembly 10 comprises at least the elastomeric cushion 2, at least the support shoe 3 and at least one dust protector 20.

In FIGS. 2 and 3, one observes the dust protector 20 of the present invention, which, when projected in a top view, defines a C-shaped profile 21, which comprises a first plane rectangular plate 22, arranged vertically with respect to a second plane rectangular plate 23, the second plate 23 being arranged vertically with respect to a third plane rectangular plate 24, the first and third plates 22, 24 being parallel to each other.

Further, the dust protector 20 comprises a first outer flap 25, arranged orthogonally to the second outer flap 26, the second flap 26 being arranged orthogonally with respect to the third outer flap 27, the first and third flaps 25, 27 being parallel to each other.

Each of the flaps 25, 26, 27 extends perpendicularly from each of the plates 22, 23, 24, respectively, so that the flaps 25, 26, 27 are supported on the same support plane of the profile 21.

FIG. 4 illustrates a top view of the dust protector 20, mounted at one of the longitudinal ends of the weighing bar assembly 10.

Figure 5:
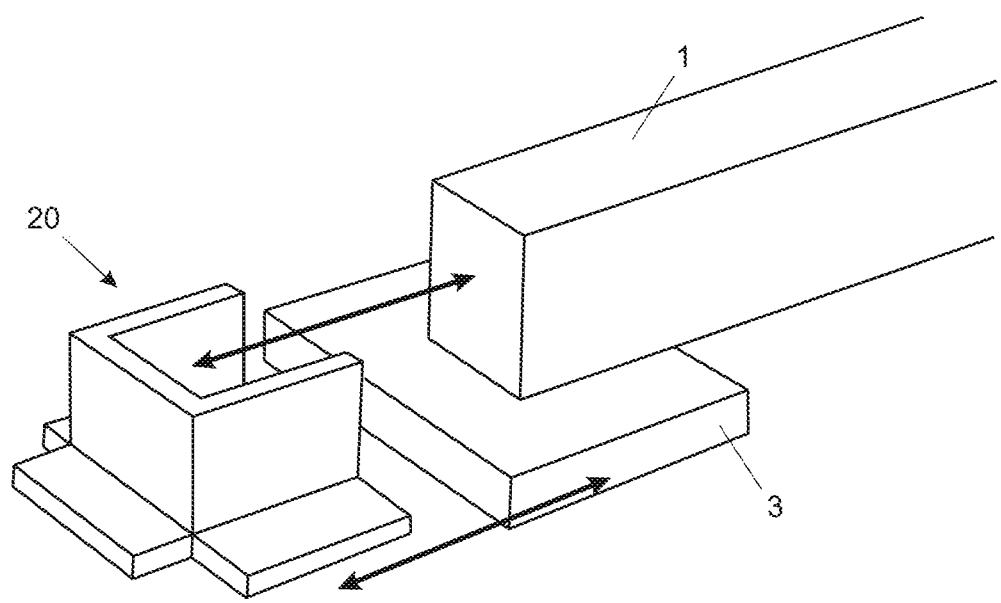
FIG. 5—a perspective view of the dust protector of the invention being mounted on the weighing bar assembly.
Figure 6:
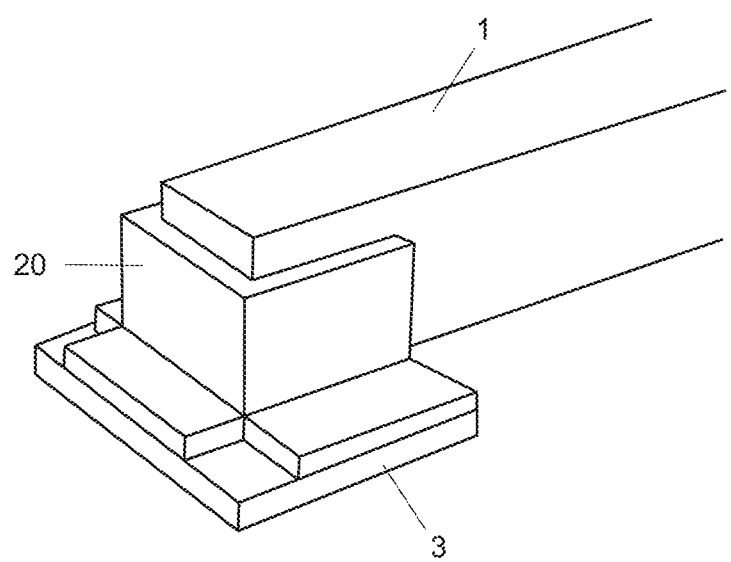
FIG. 6—another perspective view of the dust protector of the invention, mounted on the weighing bar assembly.

FIGS. 5 and 6 illustrate perspective views of the dust protector 20 being mounted at one of the longitudinal ends of the weighing bar assembly 10.

The dust protector 20 is manufactured from a metallic or polymeric material, according to the need of the environment and design. The thicknesses, widths and Heights of the plates 22, 23, 24 and of the flaps 25, 26, 27 also vary according to the design of the weighing bar assembly 10.

The main objective of the dust protector 20 lies in not allowing residues/debris/dirt to accumulate under the body 1 of the assembly 10, chiefly between the elastomeric cushion 2 and the support shoe 3.

Thus, the dust protector 20 is associated to the longitudinal ends of the body 1, so that the residues generated will be accumulated on the outer flaps 25, 26, 27 of the dust protector 20.

The dust protector 20 is easy to manufacture, by virtue of its simplified geometry, besides being easy to mount and maintain, facilitating the cleaning of the assembly 10.

The invention claimed is:

1. A weighing bar assembly comprising a structural body (1) that defines two longitudinal ends, characterized in that each of the ends of the body (1) comprises an elastomeric cushion (2), a support shoe (3), and a dust protector (20), the dust protector (20) at each end of the body (1), when projected in a top view, defines a C-shaped profile (21) including three plane rectangular plates (22, 23, 24) and three outer flaps (25, 26, 27), each of the flaps (25, 26, 27) extending perpendicularly from each of the plates (22, 23, 24), respectively, the flaps (25, 26, 27) being on a same support plane of the profile (21) such that at each end of the body (1), the flaps (25, 26, 27) are supported by the respective support shoe (3) with the respective elastomeric cushion (2) positioned within the C-shaped profile (21).

* * * * *